(12) United States Patent  
Sugimoto et al.

(10) Patent No.: US 9,347,357 B2
(45) Date of Patent: May 24, 2016

(54) HONEYCOMB CATALYST BODY (71) Applicant: NGK INSULATORS, LTD., Nagoya (JP)

(72) Inventors: Kentaro Sugimoto, Nagoya (JP); Tatsuyuki Kuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 211 days.

(21) Appl. No.: 14/036,309

(22) Filed: Sep. 25, 2013

(65) Prior Publication Data

US 2014/0086805 A1 Mar. 27, 2014

Related U.S. Application Data (60) Provisional application No. 61/706,291, filed on Sep. 27, 2012.

(30) Foreign Application Priority Data

Jul. 17, 2013 (JP) .................. 2013-148177

(51) Int. Cl.
*F01N 3/28* (2006.01)
*B01J 35/04* (2006.01)
*B01D 46/24* (2006.01)

(52) U.S. Cl.
CPC .......... *F01N 3/2828* (2013.01); *B01D 46/2429* (2013.01); *B01J 35/04* (2013.01); *B01D 46/247* (2013.01); *B01D 2046/2433* (2013.01); *B01D 2046/2496* (2013.01)

(58) Field of Classification Search
None
See application file for complete search history.

(56) References Cited

U.S. PATENT DOCUMENTS

2008/0295469 A1 12/2008 Mizuno et al.
2010/0242424 A1 9/2010 Harada et al.

FOREIGN PATENT DOCUMENTS

| EP | 0 766 993 A2 | 4/1997 |
| EP | 0 766 993 B1 | 3/2003 |
| EP | 2 484 433 A1 | 8/2012 |
| JP | 09-094434 A1 | 4/1997 |

OTHER PUBLICATIONS

Extended European Search Report (Application No. 13186505.7) dated Dec. 20, 2013.

*Primary Examiner* — Colin W Slifka
(74) *Attorney, Agent, or Firm* — Burr & Brown, PLLC (57) ABSTRACT

The honeycomb catalyst body includes a honeycomb structure having porous partition walls, outflow side plugged portions, inflow side plugged portions, and catalyst layers formed on the surfaces of the partition walls on the side of the outflow cells, the cells are formed so that an open area of each outflow cell is larger than an open area of each inflow cell, a porosity of the partition walls of the honeycomb structure is from 25 to 55%, and in a cross section parallel to the extending direction of the cells, a total area of the catalyst layers formed on the surfaces of the pores in the partition walls is 5% or less of a total area of the pores in the partition walls.

18 Claims, 2 Drawing Sheets

HONEYCOMB CATALYST BODY

The present application is an application based on U.S. 61/706,291 filed on Sep. 27, 2012 with the United States Patent and Trademark Office and JP 2013-148177 filed on Jul. 17, 2013 with the Japanese Patent Office, the entire contents of which are incorporated herein by reference.

BACKGROUND OF THE INVENTION

1. Field of the Invention

The present invention relates to a honeycomb catalyst body. More particularly, the present invention relates to a honeycomb catalyst body having a high mechanical strength, an excellent exhaust gas purification performance, and less pressure loss.

2. Description of Related Art

Heretofore, in a car engine, a construction machine engine, an industrial stationary engine, a burning device and the like, honeycomb catalyst bodies have been used to collect particulate matters while purifying $NO_x$ and the like included in exhaust gases discharged from these engines, the device and the like. In this honeycomb catalyst body, a catalyst such as zeolite is loaded onto a honeycomb structure made of silicon carbide, cordierite or the like and having a honeycomb shape.

Moreover, in the above honeycomb catalyst body, a catalyst such as zeolite is loaded onto the surfaces of partition walls with which cells of the honeycomb structure are defined and formed, and the surfaces of pores formed in the partition walls, to increase a contact area between the exhaust gas and the catalyst (e.g., see Patent Document 1).

[Patent Document 1] JP-A-H09-094434

SUMMARY OF THE INVENTION

In the above honeycomb catalyst body, a porosity of partition walls needs to be increased so as to satisfy both of loading a catalyst onto the surfaces of pores of the partition walls, and avoiding the increase of a pressure loss at the purification of an exhaust gas. However, when the porosity of the partition walls is increased, a mechanical strength of a honeycomb structure cannot sufficiently be obtained. The honeycomb catalyst body obtained by loading the catalyst onto this honeycomb structure also has the problem that the sufficient mechanical strength cannot be obtained. Moreover, when the porosity of the partition walls is excessively large, it is difficult to satisfy a regulated value ("Euro VI: $6 \times 10^{11}$" or the like) of a particle number (PN) in a state where the catalyst is not loaded. That is, particulate matters might not sufficiently be collected. Furthermore, when the porosity of the partition walls is increased, the catalyst (a slurry including the catalyst) easily penetrates into the pores during the loading of the catalyst, but the catalyst cannot easily securely be loaded onto the surfaces of the pores.

The present invention has been developed in view of the problems of such a conventional technology. An object of the present invention is to provide a honeycomb catalyst body having a high mechanical strength, an excellent exhaust gas purification performance and less pressure loss.

According to the present invention, a honeycomb catalyst body is provided as follows.

According to a first aspect of the present invention, a honeycomb catalyst body comprising: a honeycomb structure having porous partition walls with which a plurality of cells extending from an inflow side end surface to an outflow side end surface are defined and formed to become through channels of an exhaust gas is provided; outflow side plugged portions arranged in open frontal areas of the predetermined cells in the outflow side end surface, to form the inflow cells which are open in the inflow side end surface and are closed in the outflow side end surface; inflow side plugged portions arranged in open frontal areas of the remaining cells in the inflow side end surface, to form the outflow cells which are open in the outflow side end surface and are closed in the inflow side end surface; and porous catalyst layers formed on the surfaces of the partition walls on the side of the outflow cells, and having a catalyst to purify the exhaust gas, wherein in the honeycomb structure, the inflow cells and the outflow cells are alternately arranged via the partition walls, the plurality of cells are formed so that an open area of each of the outflow cells in a cross section of the outflow cell which is vertical to an extending direction of the cells is larger than an open area of each of the inflow cells in a cross section of the inflow cell which is vertical to the cell extending direction, a porosity of the partition walls of the honeycomb structure is from 25 to 55%, the catalyst layers are not formed on the surfaces of the partition walls on the side of the inflow cells, the catalyst layers are not formed on the surfaces of the pores in the partition walls, or even when the catalyst layers are formed on the surfaces of the pores in the partition walls, a total area of the catalyst layers formed on the surfaces of the pores in the partition walls is 5% or less of a total area of the pores in the partition walls, in a cross section parallel to the cell extending direction.

According to a second aspect of the present invention, the honeycomb catalyst body according to the above first aspect is provided, wherein the porosity of the catalyst layers is from 20 to 80%.

According to a third aspect of the present invention, the honeycomb catalyst body according to the above or first or second aspects is provided, wherein the open area of the outflow cell is from 1.01 to 2.5 times the open area of the inflow cell prior to the formation of the catalyst layers.

According to a fourth aspect of the present invention, the honeycomb catalyst body according to any one of the above, wherein a percentage of the open area of the outflow cell provided with the catalyst layer to the open area of the inflow cell is from 95 to 125%.

According to a fifth aspect of the present invention, the honeycomb catalyst body according to any one of the above first to fourth aspects is provided, wherein the open area of the outflow cell provided with the catalyst layer is equal to the open area of the inflow cell.

According to a sixth aspect of the present invention, the honeycomb catalyst body according to any one of the above first to fifth aspects is provided, wherein a thickness of each of the partition walls is from 102 to 254 µm.

According to a seventh aspect of the present invention, the honeycomb catalyst body according to any one of the above first to sixth aspects is provided, wherein a thickness of each of the catalyst layers is from 20 to 300 µm.

In a honeycomb catalyst body of the present invention, a porosity of partition walls is from 25 to 55%, and hence a high mechanical strength can be acquired. Moreover, in the honeycomb catalyst body of the present invention, porous catalyst layers having a catalyst to purify an exhaust gas are formed, and hence an excellent exhaust gas purification performance can be acquired. Furthermore, in the honeycomb catalyst body of the present invention, the catalyst layers are not formed on the surfaces of pores in the partition walls, or in the honeycomb catalyst body of the present invention, even when the catalyst layers are formed on the surfaces of the pores in the partition walls, a total area of the catalyst layers formed on the surfaces of the pores in the partition walls is 5% or less of a total area of the pores in the partition walls, in a cross section parallel to a cell extending direction. Consequently, in the honeycomb catalyst body of the present invention, narrowing of through channels of the exhaust gas due to the loading of the catalyst onto the surfaces of the pores can be avoided, and hence honeycomb catalyst body has less pressure loss. Moreover, in the honeycomb catalyst body of the present invention, in a plurality of cells, an open area of each outflow cell (the outflow cell prior to the formation of the catalyst layer) in a cross section of the outflow cell which is vertical to the cell extending direction is larger than an open area of each inflow cell in a cross section of the inflow cell which is vertical to the cell extending direction. Therefore, even when the catalyst layers are formed in the outflow cells, the pressure loss does not easily increase. Consequently, on the surfaces of the outflow cells (in the outflow cells), the catalyst layers can be formed sufficiently for purifying $NO_x$ and the like. In consequence, it is possible to acquire the excellent exhaust gas purification performance.

DETAILED DESCRIPTION OF THE INVENTION

Hereinafter, embodiments of the present invention will be described. It should be understood that the present invention is not limited to the following embodiments and that the following embodiments, to which suitable modifications, improvements and the like are added on the basis of ordinary knowledge of a person skilled in the art without departing from the gist of the present invention, also fall in the gist of the present invention.

Figure 1:
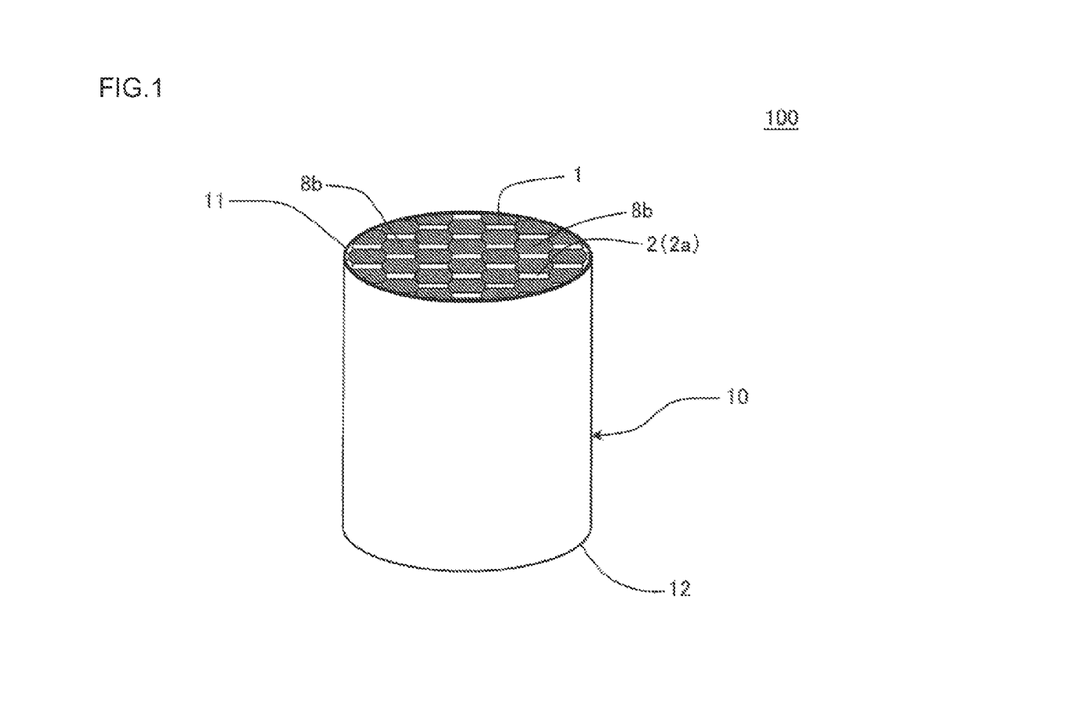
FIG. 1 is a perspective view schematically showing an embodiment of a honeycomb catalyst body of the present invention.
Figure 2:
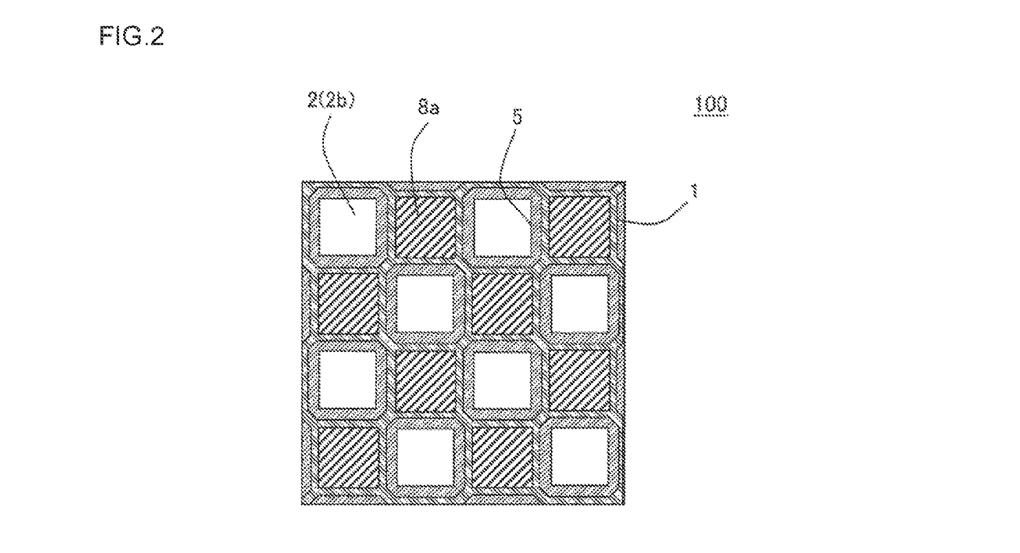
FIG. 2 is a plan view schematically showing an enlarged part of an outflow side end surface of the embodiment of the honeycomb catalyst body of the present invention.
Figure 3:
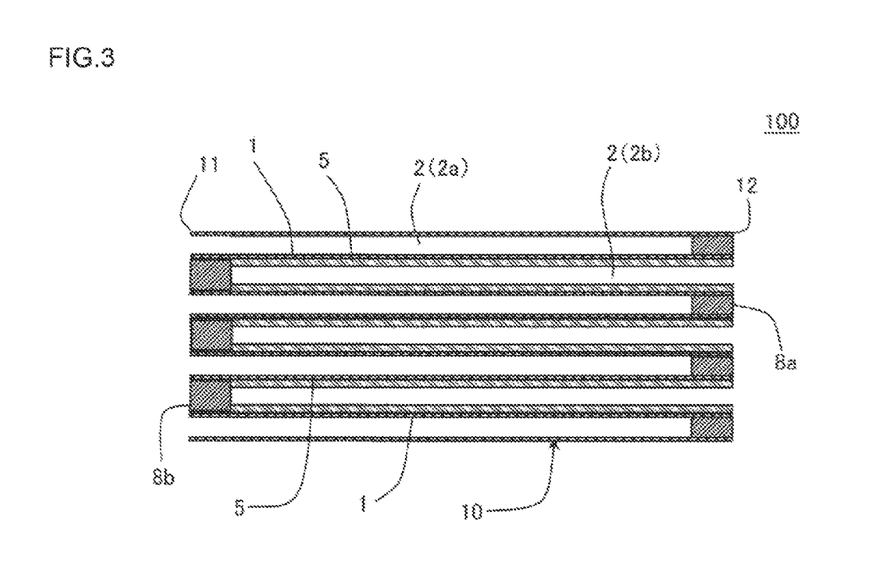
FIG. 3 is a cross sectional view schematically showing a cross section parallel to a cell extending direction in the embodiment of the honeycomb catalyst body of the present invention.

[1] Honeycomb Catalyst Body:

An embodiment of a honeycomb catalyst body of the present invention is, for example, a honeycomb catalyst body 100 shown in FIG. 1 to FIG. 3. The honeycomb catalyst body 100 includes a honeycomb structure 10 having porous partition walls 1 with which a plurality of cells 2 extending from an inflow side end surface 11 to an outflow side end surface 12 are defined and formed to become through channels of an exhaust gas. Moreover, the honeycomb catalyst body 100 includes porous catalyst layers 5 formed on the surfaces of the partition walls 1 in outflow cells 2b of the honeycomb structure 10, and having a catalyst to purify the exhaust gas. Furthermore, the honeycomb structure 10 includes outflow side plugged portions 8a arranged in open frontal areas of the predetermined cells 2 in the outflow side end surface 12, to form inflow cells 2a which are open in the inflow side end surface 11 and are closed in the outflow side end surface 12. Additionally, the honeycomb structure 10 includes inflow side plugged portions 8b arranged in open frontal areas of the remaining cells 2 in the inflow side end surface 11, to form outflow cells 2b which are open in the outflow side end surface 12 and are closed in the inflow side end surface 11. Moreover, in the honeycomb structure 10, the inflow cells 2a and the outflow cells 2b are alternately arranged via the partition walls 1. Furthermore, the plurality of cells 2 of the honeycomb structure 10 are formed so that an open area of each of the outflow cells 2b in a cross section of the outflow cell which is vertical to an extending direction of the cells 2 is larger than an open area of each of the inflow cells 2a in a cross section of the inflow cell which is vertical to the extending direction of the cells 2. Additionally, a porosity of the partition walls 1 of the honeycomb structure 10 is from 25 to 55%. In the honeycomb catalyst body 100, the catalyst layers 5 are not formed on the surfaces of pores in the partition walls 1, or in the honeycomb catalyst body 100, even when the catalyst layers are formed on the surfaces of the pores in the partition walls 1, a total area of the catalyst layers 5 formed on the surfaces of the pores in the partition walls 1 is 5% or less of a total area of the pores in the partition walls 1, in a cross section parallel to the extending direction of the cells 2.

In the honeycomb catalyst body 100, a porosity of the partition walls 1 is from 25 to 55%, and hence a high mechanical strength can be acquired. Moreover, in the honeycomb catalyst body 100, the porous catalyst layers 5 having the catalyst to purify the exhaust gas are formed, and hence an excellent exhaust gas purification performance can be acquired. Furthermore, in the honeycomb catalyst body 100, the catalyst layers 5 are not formed on the surfaces of the pores in the partition walls 1, or in the honeycomb catalyst body 100, even when the catalyst layers are formed on the surfaces of the pores in the partition walls 1, the total area of the catalyst layers 5 formed on the surfaces of the pores in the partition walls 1 is 5% or less of the total area of the pores in the partition walls 1, in the cross section parallel to the extending direction of the cells 2. Therefore, the narrowing of the through channels of the exhaust gas due to the loading of the catalyst onto the surfaces of the pores can be avoided, and hence the honeycomb catalyst body 100 has less pressure loss.

It is to be noted that FIG. 1 is a perspective view schematically showing this embodiment of the honeycomb catalyst body of the present invention. FIG. 2 is a plan view schematically showing an enlarged part of the outflow side end surface of the embodiment of the honeycomb catalyst body of the present invention. FIG. 3 is a cross sectional view schematically showing the cross section parallel to the cell extending direction in the embodiment of the honeycomb catalyst body of the present invention.

In the honeycomb catalyst body of the present invention, functions are assigned to a portion which purifies the exhaust gas (i.e., the catalyst), and a portion having a maintainable mechanical strength and having a function of a filter capable of satisfying a regulated emission value of a PN (i.e., the honeycomb structure). That is, the honeycomb catalyst body of the present invention is provided with portions (the partition walls) having the function of the filter to collect the PN, and portions (the catalyst layers) to purify the exhaust gas, separately from these partition walls, thereby producing effects such as a high mechanical strength, an excellent exhaust gas purification performance and less pressure loss.

Specifically, in the honeycomb catalyst body of the present invention, the partition walls of the honeycomb structure have a low porosity (from 25 to 55%), and hence the honeycomb catalyst body has a sufficiently high mechanical strength even to a pressure applied at canning. Moreover, due to the low porosity (from 25 to 55%), a thickness of each partition wall can be small (from about 102 to 254 μm). Furthermore, the partition walls of the honeycomb structure have the low porosity (from 25 to 55%), and hence the PN in the exhaust gas can securely be collected.

Furthermore, in the honeycomb catalyst body of the present invention, the catalyst layers are not formed on the surfaces of the pores in the partition walls, or in the honeycomb catalyst body of the present invention, even when the catalyst layers are formed on the surfaces of the pores in the partition walls, the total area of the catalyst layers formed on the surfaces of the pores in the partition walls is 5% or less of the total area of the pores in the partition walls, in the cross section parallel to the cell extending direction. That is, in the honeycomb catalyst body of the present invention, the catalyst is not substantially loaded onto (the catalyst layers are not formed on) the surfaces of the pores in the partition walls. Therefore, the narrowing of the through channels of the exhaust gas due to the loading of the catalyst onto the surfaces of the pores can be avoided, and hence the honeycomb catalyst body of the present invention has less pressure loss. It is to be noted that in the cross section parallel to the cell extending direction, the percentage of "the total area of the catalyst layers formed on the surfaces of the pores in the partition walls" in the total area of the pores in the partition walls is a value calculated as follows. That is, any number of (e.g., ten portions) images of the partition walls in the cross section parallel to the cell extending direction are photographed, the photographed images are subjected to image analysis, and areas of the pores and catalyst layers in the images are measured to calculate the value. A region (a size) of each of the above images is a region of 500 μm×500 μm.

Moreover, in the honeycomb catalyst body of the present invention, the plurality of cells are formed so that the open area of each of the outflow cells (the outflow cells prior to the formation of the catalyst layers) in the cross section of the outflow cell which is vertical to the cell extending direction is larger than the open area of each inflow cell in the cross section of the inflow cell which is vertical to the cell extending direction. Therefore, even when the catalyst layers are formed in the outflow cells, the pressure loss does not easily increase. Therefore, on the surfaces of the outflow cells (in the outflow cells), the catalyst layers can be formed sufficiently to purify $NO_x$ and the like. In consequence, it is possible to acquire the excellent exhaust gas purification performance. That is, when the open area of the inflow cell is the same as the open area of the outflow cell and when the catalyst layers are formed on the surfaces of the partition walls on the side of the outflow cells, the above open area of the outflow cell decreases as much as the area of the catalyst layer. Therefore, for suppressing the increase of the pressure loss, it is necessary to employ a method of decreasing a thickness of each catalyst layer, or the like. However, when the thickness of the catalyst layer is decreased, a problem such as the deterioration of the exhaust gas purification performance occurs. Therefore, according to the above constitution, it is possible to acquire the excellent exhaust gas purification performance while preventing the increase of the pressure loss.

Furthermore, to regenerate the honeycomb catalyst body, soot deposited in the honeycomb catalyst body is burnt sometimes, but in this case, a temperature of the soot rises in the honeycomb catalyst body. Moreover, at this time, when the high temperature soot comes in contact with the catalyst (the catalyst layers), the catalyst might deteriorate (specifically, the catalyst might be denatured by the high temperature soot). Here, in the honeycomb catalyst body of the present invention, the soot is accumulated in the inflow cells, and between the soot and the catalyst, the partition wall to separate the soot from the catalyst is interposed. Consequently, in the honeycomb catalyst body of the present invention, the soot can be separated from the catalyst so that the soot does not directly come in contact with the catalyst. In the honeycomb catalyst body of the present invention, the soot is separated from the catalyst as described above, and hence heat of the high temperature soot can be prevented from being directly transferred to the catalyst. Consequently, the catalyst can be prevented from being deteriorated by the heat of the high temperature during the burning of the soot.

[1-1] Honeycomb Structure:

In the honeycomb catalyst body 100, there is not any special restriction on a shape of the honeycomb structure 10, but the shape is preferably a cylindrical shape, a tubular shape with oval end surfaces, a square pillar shape with end surfaces having a polygonal shape such as "a square shape, a rectangular shape, a triangular shape, a pentangular shape, a hexagonal shape, or an octagonal shape", or the like. The honeycomb structure 10 shown in FIG. 1 shows an example of the cylindrical shape.

In the honeycomb structure, the outflow cells and the inflow cells are alternately arranged via the partition walls. Moreover, in the honeycomb structure, one of ends of each cell is closed with the plugged portion (the outflow side plugged portion or the inflow side plugged portion). For example, in the honeycomb catalyst body 100 shown in FIG. 1, the outflow cells 2b and the inflow cells 2a are alternately arranged via the partition walls 1. According to such a constitution, a fluid which has flowed into the inflow cell 2a passes through the partition wall 1 and the catalyst layer 5 to flow into the outflow cells 2b, and is discharged from the open frontal area on the side of the outflow side end surface 12. Moreover, when the exhaust gas passes through the partition walls 1, the PN is collected, and when the exhaust gas passes through the catalyst layers 5, the exhaust gas including $NO_x$ and the like is purified.

The open area of the outflow cell 2b in the cross section of the outflow cell which is vertical to the extending direction of the cells 2 is larger than the open area of the inflow cell 2a in the cross section of the inflow cell which is vertical to the extending direction of the cells 2. According to such a constitution of the outflow and inflow cells, a problem such as the increase of the pressure loss is not caused, but the catalyst layers can be formed on the surfaces of the partition walls on the side of the outflow cells. Moreover, there is not any special restriction on a cell shape as long as the above conditions are satisfied, and an example of the shape is a polygonal shape such as a triangular shape, a quadrangular shape, a hexagonal shape or an octagonal shape. Especially, the shape of the outflow cells is preferably the octagonal shape, and the shape of the inflow cells is preferably the quadrangular shape. In this case, a desirable amount of the catalyst can easily be loaded.

The open area of each outflow cell prior to the formation of the catalyst layer (prior to the loading of the catalyst) is preferably from 1.01 to 2.5 times, further preferably from 1.2 to 2.5 times, and especially preferably from 1.4 to 2.5 times the open area of each inflow cell. In the above range of the size of the open area of the outflow cell to the open area of the inflow cell, the increase of the pressure loss after the formation of the catalyst layer can be prevented. When the size is smaller than the above lower limit value of the rate, the through channels of the outflow cells might be narrowed at the loading of the catalyst layers, and the pressure loss might increase. In excess of the above upper limit value thereof, the open area of the inflow cell relatively decreases excessively. The through channels of the inflow cells might then be narrowed, and the pressure loss might increase. Additionally, the catalyst layers are formed as described later so that a percentage of the open area of the inflow cell to the open area of the outflow cell provided with the catalyst layer is from 95 to 125%. It is to be noted that the open areas of the outflow cell and the inflow cell are values measured as follows. That is, the honeycomb catalyst body is first cut in a direction perpendicular to the cell extending direction. Next, in this cut cross section, any number of (e.g., ten portions) images are photographed, the photographed images are subjected to image analysis, and an open area ratio is calculated from a ratio between a rate of the open frontal areas (the rate of the areas) prior to the loading of the catalyst and a total of rates of the partition walls and plugged portions (the rate of the total of the areas). A region of each image is a region of 3 mm×3 mm. After the loading of the catalyst, the open area ratio is calculated from the ratio between the rate of the open frontal areas and the total of rates of the catalyst in addition to the partition walls and the plugged portions.

As described above, the porosity of the partition walls 1 is from 25 to 55%, preferably from 30 to 50%, and further preferably from 35 to 45%. In the above range of the porosity of the partition walls 1, this partition wall can function as the filter to collect the PN while maintaining the mechanical strength of the honeycomb catalyst body 100. When the porosity of the partition walls 1 is smaller than 25%, the pressure loss of the honeycomb catalyst body 100 increases. When the porosity of the partition walls 1 is larger than 55%, the mechanical strength of the honeycomb catalyst body 100 cannot sufficiently be maintained. The porosity of the partition walls is a value measured by a mercury porosimeter, i.e., a value calculated from an amount of mercury which has penetrated into the pores during pressurization.

A thickness of the partition wall 1 is preferably from 102 to 254 μm, further preferably from 102 to 203 μm, and especially preferably from 102 to 152 μm. In the above range of the thickness of the partition wall 1, it is possible to obtain the honeycomb catalyst body 100 which can suppress the increase of the pressure loss while sufficiently maintaining the mechanical strength of the honeycomb catalyst body 100. When the thickness of the partition wall 1 smaller than 102 μm, the mechanical strength of the honeycomb catalyst body 100 might not sufficiently be obtained. When the thickness of the partition wall 1 is larger than 254 μm, the pressure loss of the honeycomb catalyst body 100 increases sometimes. The thickness of the partition wall 1 is a thickness of the partition wall in a portion which defines the inflow cell and the outflow cell. "The thickness of the partition wall 1" is a thickness of the partition wall 1 in the cross section of the partition wall which is vertical to the extending direction of the cells 2.

The thicknesses of the partition walls 1 constituting the honeycomb structure 10 are basically uniform. "The basically uniform thickness" means that the thicknesses of the partition walls are uniform except for a case where a slight difference is made in thickness between the partition walls due to deformation at the formation, or the like. That is, in the honeycomb catalyst body of the present invention, any difference in thickness is not intentionally made between the partition walls, and in the above cross section, the thicknesses of the partition walls are uniform. For example, when a slit of a die (a mold) for extrusion forming of the honeycomb structure is manufactured by slicer processing, the partition walls having the uniform thickness are realized.

An average pore diameter of the partition walls 1 is preferably from 6 to 19 μm, and further preferably from 7 to 16 μm. In the above range of the average pore diameter of the partition walls 1, the partition wall 1 can function as the filter to collect the PN while suppressing the increase of the pressure loss. When the average pore diameter of the partition walls 1 is smaller than 6 μm, the pressure loss of the honeycomb catalyst body 100 excessively increases sometimes. When the average pore diameter of the partition walls 1 is larger than 19 μm, a collecting efficiency without the loaded catalyst might be insufficient. Moreover, the PN is not easily collected by the partition walls, and the function of the filter might not easily be obtained. Furthermore, the PN is collected by the catalyst layers sometimes, and a purification efficiency by the catalyst might deteriorate. The average pore diameter of the partition walls is the value measured by the mercury porosimeter, i.e., the value calculated from the amount of mercury which has penetrated into the pores during the pressurization.

A cell density of the honeycomb structure 10 is preferably from 31 to 62 cells/cm$^2$, and further preferably from 39 to 54 cells/cm$^2$. In the above range of the cell density, the increase of the pressure loss can be suppressed while sufficiently maintaining the mechanical strength of the honeycomb catalyst body 100. When the cell density is smaller than 31 cells/cm$^2$, the mechanical strength of the honeycomb catalyst body 100 might not sufficiently be obtained. When the cell density is larger than 62 cells/cm$^2$, the pressure loss might excessively increase.

A material of the partition walls 1 is preferably a ceramic material, and further preferably at least one selected from the group consisting of cordierite, silicon carbide, a silicon-silicon carbide composite material, mullite, alumina, aluminum titanate, silicon nitride, and a silicon carbide-cordierite composite material, because of excellent strength and heat resistance. Among these materials, silicon carbide is especially preferable.

An example of a material of the plugged portions (the inflow side plugged portions 8b and the outflow side plugged portions 8a) is the same material as in the partition walls 1, and the same material as in the partition walls 1 is preferably used.

[1-2] Catalyst Layer:

Each of the catalyst layers 5 is a porous catalyst layers formed on the surface of the partition wall 1 on the side of the outflow cell 2b, and having the catalyst to purify the exhaust gas. Moreover, the catalyst layers 5 are not formed on the surfaces of the pores in the partition walls 1, but even when the catalyst layers 5 are formed on the surfaces of the pores in the partition walls 1, the total area of the catalyst layers 5 formed on the surfaces of the pores in the partition walls 1 is 5% or less of the total area of the pores in the partition walls 1, in the cross section parallel to the cell extending direction. Consequently, in the honeycomb catalyst body of the present invention, the catalyst layers are not formed on the surfaces of the pores in the partition walls, or even when the catalyst layers are formed on the surfaces of the pores in the partition walls, a noticeably small amount of the catalyst layers is formed. Therefore, the narrowing of the through channels of the exhaust gas due to the loading of the catalyst onto the surfaces of the pores can be avoided. In consequence, the increase of the pressure loss can be suppressed.

It is to be noted that even when the catalyst layers are formed on the surfaces of the pores in the partition walls, each whole catalyst layer is preferably formed in a region of 10% of the thickness of each partition wall from the surface of the partition wall on the side of the outflow cell. When the catalyst layer is formed beyond the above region, the pressure loss of the honeycomb catalyst body might increase.

A porosity of the catalyst layers 5 is preferably from 20 to 80%, further preferably from 25 to 75%, and especially preferably from 30 to 70%. In the above range of the porosity of the catalyst layers 5, the exhaust gas purification performance can advantageously suitably be maintained while suppressing the increase of the pressure loss. When the porosity of the catalyst layers 5 is smaller than 20%, the pressure loss of the honeycomb catalyst body 100 might increase. When the porosity of the catalyst layers 5 is larger than 80%, the exhaust gas purification performance might deteriorate. The porosity of the catalyst layers is a value measured by image analysis similar to that in the above measurement of the open areas of the outflow and inflow cells.

A thickness of each of the catalyst layers 5 is preferably from 20 to 300 μm, further preferably from 50 to 300 μm, and especially preferably from 100 to 300 μm. In the above range of the thickness of the catalyst layer 5, the exhaust gas purification performance is suitably maintained, and the pressure loss does not easily increase. When the thickness of the catalyst layer 5 is smaller than 20 μm, the exhaust gas purification performance might deteriorate. When the thickness of the catalyst layer 5 is larger than 300 μm, the pressure loss of the honeycomb catalyst body 100 increases sometimes. The thickness of the catalyst layer 5 is a thickness of the catalyst layer 5 in the cross section of the catalyst layer which is vertical to the extending direction of the cells 2, and a thickness of the thickest portion of the catalyst layer.

It is to be noted that the thickness of the catalyst layer is preferably in the above range, but can suitably be set in accordance with a use application or the like of the honeycomb catalyst body, and is preferably determined so that the open area of the outflow cell provided with the catalyst layer is equal to the open area of the inflow cell.

An average pore diameter of the catalyst layers 5 is preferably from 1 to 15 μm, further preferably from 1 to 13 μm, and especially preferably from 1 to 10 μm. In the above range of the average pore diameter of the catalyst layers 5, peel-off of the catalyst can be suppressed while suppressing the increase of the pressure loss. When the average pore diameter of the catalyst layers 5 is smaller than 1 μm, the pressure loss of the honeycomb catalyst body 100 increases sometimes. When the average pore diameter of the catalyst layers 5 is larger than 15 μm, the catalyst might peel off from a base material. The average pore diameter of the catalyst layers is a value measured by image analysis similar to the above image analysis.

Examples of the catalyst constituting the catalyst layers include zeolite, $V_2O_5$, $CeO_2$, and $ZrO_2$. As the catalyst, zeolite is used, so that $NO_x$ in the exhaust gas can suitably be purified. As zeolite, Fe zeolite, Cu zeolite or the like is preferably used.

An amount of the catalyst to be loaded is preferably from 10 to 300 g/l, further preferably from 50 to 300 g/l, and especially preferably from 100 to 300 g/l. In the above range of the amount of the catalyst to be loaded, a required purification performance can be performed, and the increase of the pressure loss can be suppressed. When the amount of the catalyst to be loaded is smaller than 10 g/l, the required purification performance might not be achieved. When the amount of the catalyst to be loaded is larger than 300 g/l, the open area of each outflow cell is decreased by the catalyst layer. Therefore, the pressure loss might increase. The amount of the catalyst to be loaded is a value calculated from a difference between measured masses of the honeycomb catalyst body before and after the loading of the catalyst.

A density of the catalyst is preferably from 0.5 to 2.0 g/ml, and further preferably from 0.75 to 1.5 g/ml. In the above range of the density of the catalyst, the exhaust gas purification performance can advantageously suitably be maintained while suppressing the increase of the pressure loss. When the density of the catalyst is smaller than 0.5 g/ml, the pressure loss of the honeycomb catalyst body 100 might increase. When the density of the catalyst is larger than 2.0 g/ml, the exhaust gas purification performance might deteriorate. The density of the catalyst is a value calculated from the amount of the catalyst to be loaded and the catalyst porosity.

In the honeycomb catalyst body 100, a percentage of the open area of the inflow cell 2a to the open area of the outflow cell 2b provided with the catalyst layer 5 (i.e., an area obtained by subtracting the area of the catalyst layer 5 from the open area of the outflow cell 2b) is preferably from 95 to 125%. Moreover, the percentage of the open area of the outflow cell 2b provided with the catalyst layer 5 is further preferably from 95 to 115%, and especially preferably 95 to 105%. Furthermore, the open area of the outflow cell provided with the catalyst layer is most preferably equal to the open area of the inflow cell. Here, in the present description, "equal" means that the open area of the inflow cell 2a is from 95 to 105% of the open area of the outflow cell 2b provided with the catalyst layer 5. It is to be noted that in the present description, "the open area" is the open area of the outflow cell 2b in the cross section of the outflow cell which is vertical to the extending direction of the cells 2. When the above "open area of the outflow cell provided with the catalyst layer" is from 95 to 125% of the open area of the inflow cell 2a, the pressure loss of the honeycomb catalyst body can further be suppressed. When the percentage is smaller than the lower limit value of the percentage, a surface area of the inflow cell decreases, i.e., the area of a portion which functions as the filter decreases. Therefore, the pressure loss at the deposition of the soot in the honeycomb catalyst body might increase. In excess of the upper limit value of the percentage, the open area of the outflow cell excessively decreases. Therefore, the pressure loss in an initial stage of an operation of an engine (the initial pressure loss) might increase.

A length L of the honeycomb catalyst body 100 in the extending direction of the cells 2 is preferably from 76.2 to 304.8 mm. Moreover, a diameter D of the cross section of the honeycomb catalyst body 100 which is perpendicular to the extending direction of the cells 2 is preferably from 100.0 to 304.8 mm.

In the honeycomb catalyst body 100, a value of the length L/the diameter D is preferably from 0.5 to 2.5, and further preferably from 0.5 to 1.8. In the above range, a resistance to heat stress at soot regeneration can be acquired while suppressing the increase of the pressure loss.

[2] Manufacturing Method of Honeycomb Catalyst Body:

A manufacturing method of the honeycomb catalyst body of the present invention will be described. First, a kneaded material to prepare the honeycomb structure is prepared, and this kneaded material is formed, to prepare a formed honeycomb body (a forming step). In the formed honeycomb body to be prepared, two types of cells (outflow cells and inflow cells) having different open areas in a cross section of each cell which is vertical to a cell extending direction are alternately formed via partition walls. A shape, size (sectional area) or the like of each cell can suitably be determined in conformity to the above-mentioned preferable example of the cells of the honeycomb structure. It is to be noted that the formed honeycomb body can be dried as required, to obtain a dried honeycomb body.

Next, the obtained formed honeycomb body (or the dried honeycomb body dried as required) is fired to prepare the honeycomb structure (a honeycomb structure preparing step).

Next, plugged portions are arranged in open frontal areas of predetermined cells including the outflow cells and the inflow cells in one end (an inflow side end) of the formed honeycomb body, and open frontal areas of the remaining cells including the outflow cells and the inflow cells in the other end (an outflow side end) of the formed honeycomb body. In this way, the inflow side plugged portions and the outflow side plugged portions are formed (a plugging step). In this way, a plugged honeycomb structure can be obtained.

Next, a catalyst slurry containing the catalyst is poured only into the outflow cells of the obtained plugged honeycomb structure, to form catalyst coating layers made of the catalyst slurry on the surfaces of the partition walls. Afterward, the catalyst coating layers are dried, to form the catalyst layers on the surfaces of the partition walls on the side of the outflow cells. In this way, the honeycomb catalyst body can be manufactured. Hereinafter, the respective manufacturing steps will be described in more detail.

[2-1] Forming Step:

First, in the forming step, a ceramic forming raw material containing a ceramic raw material is prepared, to obtain the formed honeycomb body in which a plurality of cells are formed to become through channels of a fluid.

Examples of the ceramic raw material contained in the ceramic forming raw material preferably include silicon carbide (SiC), a silicon-silicon carbide composite material formed by using silicon carbide (SiC) as an aggregate and silicon (Si) as a binding agent, silicon nitride, a cordierite forming raw material, cordierite, mullite, alumina, titania, and aluminum titanate. Moreover, the ceramic raw material is preferably at least one selected from the group consisting of silicon carbide (SiC), the silicon-silicon carbide composite material, the cordierite forming raw material, cordierite, mullite, alumina, titania, and aluminum titanate. It is to be noted that "the cordierite forming raw material" is the ceramic raw material blended so as to have a chemical composition in which silica falls in a range of 42 to 56 mass %, alumina falls in a range of 30 to 45 mass % and magnesia falls in a range of 12 to 16 mass %, and the material is fired to become cordierite.

Moreover, this ceramic forming raw material is preferably prepared by mixing the above ceramic raw material with a dispersion medium, an organic binder, an inorganic binder, a pore former, a surfactant and the like. There is not any special restriction on a composition ratio of each raw material, and the composition ratio is preferably determined in accordance with a structure, a material and the like of the honeycomb structure to be prepared.

To form the ceramic forming raw material, first, the forming raw material is kneaded to obtain a kneaded material, and the obtained kneaded material is preferably formed into a honeycomb shape. There is not any special restriction on a method of kneading the forming raw material to form the kneaded material, and an example of the method is a method using a kneader, a vacuum clay kneader or the like. There is not any special restriction on a method of forming the kneaded material to obtain the formed honeycomb body, and a heretofore known forming method such as extrusion forming or injection forming can be used. A suitable example of the method is a method of extruding the kneaded material by use of a die having a desirable cell shape, partition wall thickness or cell density to obtain the formed honeycomb body. A material of the die is preferably a refractory metal which does not easily wear down.

There is not any special restriction on a shape of the formed honeycomb body, and examples of the shape include a cylindrical shape (a columnar shape), and a tubular shape (a pillar shape) in which a cross section perpendicular to a central axis has an oval shape, a race track shape, or a polygonal shape such as a triangular shape, a rectangular shape, a pentangular shape, a hexagonal shape, or an octagonal shape. When the honeycomb structure to be prepared is formed by joining a plurality of honeycomb segments, the shape of the formed honeycomb body is preferably the tubular shape (the pillar shape) in which the cross section perpendicular to the central axis has a polygonal shape such as the triangular shape, the rectangular shape, the pentangular shape, the hexagonal shape, or the octagonal shape. These bodies can easily be assembled to constitute one honeycomb structure.

Moreover, after the above-mentioned formation, the obtained formed honeycomb body may be dried. There is not any special restriction on a drying method, but examples of the drying method include hot air drying, microwave drying, dielectric drying, reduced-pressure drying, vacuum drying, and freeze-drying. Above all, the dielectric drying, the microwave drying, the hot air drying or any combination of these methods is preferably performed.

[2-2] Honeycomb Structure Preparing Step:

Next, the obtained formed honeycomb body is fired to prepare the honeycomb structure. It is to be noted that the firing of the formed honeycomb body may be performed after the plugged portions are arranged in the formed honeycomb body.

Moreover, prior to the firing of the formed honeycomb body (the main firing), the formed honeycomb body is preferably calcinated. The calcination is performed for degreasing. There is not any special restriction on a calcinating method, as long as organic substances (the organic binder, a dispersant, the pore former, etc.) in the formed honeycomb body can be removed. In general, a burning temperature of the organic binder is from about 100 to 300° C., and a burning temperature of the pore former is from about 200 to 800° C. Therefore, as calcination conditions, heating is preferably performed at about 200 to 1000° C. in an oxidation atmosphere for about three to 100 hours.

The firing (the main firing) of the formed honeycomb body is performed so as to sinter and densify the forming raw material constituting the calcinated formed body, thereby acquiring a predetermined strength. Firing conditions (temperature, time, and atmosphere) vary in accordance with the type of the forming raw material, and hence suitable conditions may be selected in accordance with the type of the raw material. For example, when silicon carbide (SiC) is used, the firing temperature is preferably from 1200 to 1500° C. Moreover, the firing time is preferably from one to five hours, as time to keep the highest temperature. Furthermore, when the cordierite forming raw material is used, the firing temperature is preferably from 1410 to 1440° C. Moreover, the firing time is preferably from four to six hours, as the time to keep the highest temperature.

It is to be noted that when the honeycomb catalyst body is constituted of the plurality of honeycomb segments, the plurality of formed honeycomb bodies or fired formed honeycomb bodies are arranged adjacent to each other so that side surfaces of the honeycomb bodies face each other, and the honeycomb bodies are joined by a joining material. As the joining material, a heretofore known joining material can be used.

[2-3] Plugging Step:

Next, a plugging material is filled into the open frontal areas of the predetermined cells in the outflow side end surface and the open frontal areas of the remaining cells in the inflow side end surface of the honeycomb structure, to form the inflow side plugged portions and the outflow side plugged portions.

When the plugging material is filled into the honeycomb structure, the plugging material is first filled into one end side of the honeycomb structure, and then filled into the other end side of the honeycomb structure. An example of a method of filling the plugging material into the one end side is preferably a method having a masking step and a press-in step as follows.

The masking step is a step of attaching a sheet to the one end surface (e.g., the inflow side end surface) of the honeycomb structure, and making holes in portions of the sheet which overlap with "cells to be provided with the plugged portions". The press-in step is a step of pressing "an end of the honeycomb structure to which the sheet has been attached" into a container which contains the plugging material, to press the plugging material into the cells of the honeycomb structure. When the plugging material is pressed into the cells of the honeycomb structure, the plugging material passes through the holes made in the sheet, and is filled into the only cells that communicate with the holes made in the sheet.

Next, the plugging material filled into the honeycomb structure is dried to form the plugged portions, thereby obtaining the plugged honeycomb structure. It is to be noted that the plugging material may be filled into both the ends of the honeycomb structure, and then the plugging material may be dried. Moreover, the plugging material filled into the one end of the honeycomb structure may be dried, the plugging material may be filled into the other end thereof, and then the plugging material filled into the other end may be dried. Furthermore, for the purpose of more securely fixing the plugging material, the plugging material may be fired. Additionally, the plugging material may be filled into the formed honeycomb body before or after the drying, and the plugging material may be fired together with the formed honeycomb body before or after the drying.

[2-4] Catalyst Loading Step:

Next, the catalyst slurry containing the catalyst is poured only into the outflow cells of the obtained plugged honeycomb structure, to form the catalyst coating layers made of the catalyst slurry on the surfaces of the partition walls. It is to be noted that this catalyst slurry cannot easily penetrate into the pores of the partition walls, as a viscosity of the catalyst slurry increases. Therefore, the catalyst coating layers are formed only on the surfaces of the partition walls. Afterward, the catalyst coating layers are dried, to form the catalyst layers on the surfaces of the partition walls on the side of the outflow cells. As described above, the honeycomb catalyst body can be manufactured.

Drying conditions of the catalyst coating layers can be, for example, from 400 to 600° C. and from one to ten hours.

The viscosity of the catalyst slurry can be, for example, from 1.5 to 2.5 Pa·s.

EXAMPLES

Hereinafter, the present invention will specifically be described with respect to examples, but the present invention is not limited to these examples.

Example 1

As honeycomb segment raw materials, SiC powder and metal Si powder were mixed at a mass ratio of 80:20, and to this mixture, starch and resin balloon were added as pore formers. Furthermore, methylcellulose, hydroxypropoxyl methylcellulose, a surfactant and water were added, to prepare a kneaded material having plasticity. This kneaded material was extruded to obtain 16 formed honeycomb segment bodies. In a cross section of this formed honeycomb segment body which was vertical to a cell extending direction, octagonal cells (outflow cells) and quadrangular cells (inflow cells) were alternately formed via partition walls.

The obtained formed honeycomb segment bodies were dried, degreased at 400° C. in the atmospheric air, and then fired at 1450° C. in an Ar inert atmosphere. In this way, honeycomb segments were obtained.

Moreover, the whole shape of the formed honeycomb segment bodies was a regular quadrangular pillar shape.

Next, masks were applied to end surfaces (an inflow side end surface and an outflow side end surface) of each formed honeycomb segment body. At this time, cells provided with the mask and cells which were not provided with the mask were alternately arranged. Specifically, each end surface was provided with the mask in which any holes were not made, and the holes were made in portions of the mask which closed the cells to be provided with plugged portions. Then, the masked end of the body was immersed into a plugging slurry (a plugging material), to fill the plugging slurry into open frontal areas of the cells which were not provided with the mask. In consequence, there was obtained a plugged formed honeycomb segment body in which the open frontal areas of the predetermined cells in the inflow side end surface and the open frontal areas of the remaining cells in the outflow side end surface were provided with the plugging slurry. As the plugging slurry, a slurry containing a material similar to the honeycomb segment raw material was used.

Next, each plugged formed honeycomb segment body was degreased by heating the body at 450° C. for five hours, and the honeycomb segment body was fired by further heating the body at 1425° C. for seven hours, to obtain plugged honeycomb segments. In the plugged honeycomb segments, a partition wall thickness was 152 μm. Moreover, in the plugged honeycomb segments, one side of each end surface was 36 mm, and a length in the cell extending direction was 152.4 mm. In the plugged honeycomb segments, a partition wall porosity was 40%. An average pore diameter of the partition walls was 10 μm. A cell density was 47 cells/cm$^2$.

Next, these plugged honeycomb segments were arranged adjacent to each other so that the side surfaces of the segments faced each other, and the segments were joined by a joining material. Specifically, a joining material composition was applied to the side surface of one plugged honeycomb segment to form a joining material layer, and another plugged honeycomb segment was disposed on this joining material layer. This step was repeated to obtain a joined honeycomb segment assembly of four vertical segments×four horizontal segments. Then, an outer periphery of this joined honeycomb segment assembly was cut so as to obtain a cylindrical shape, and then a coating material was applied to this outer periphery of the assembly, and dried at 700° C. for two hours to harden. In this way, a plugged honeycomb structure was obtained. In the obtained plugged honeycomb structure, an open area of inflow cells was 4683 mm$^2$, and an open area of outflow cells was 6998 mm$^2$. Moreover, a percentage of the open area of the inflow cell to the open area of the outflow cell prior to the formation of the catalyst layer (described as "an open area ratio (%) prior to the loading of the catalyst" in Table 1) was 66.9%. The measurement results are shown in Table 1.

Next, the catalyst slurry containing Fe zeolite as the catalyst was poured only into the outflow cells (the octagonal cells) of the obtained plugged honeycomb structure, to form catalyst coating layers on the surfaces of the partition walls on the side of the outflow cells. Afterward, the layers were dried at 450° C. for two hours to prepare a honeycomb catalyst body.

In the prepared honeycomb catalyst body, the open area of the outflow cells provided with the catalyst layers was 4683 mm$^2$. Moreover, the percentage of the open area of the inflow cells to the open area of the outflow cells provided with the catalyst layers (described as "an open area ratio (%) after the loading of the catalyst" in Table 1) was 100.0%. Furthermore, in the prepared honeycomb catalyst body, a thickness of each catalyst layer was 134 μm. A porosity of the catalyst layers was 68%. An average pore diameter of the catalyst layers was 5 μm. An amount of the catalyst to be loaded was 123.0 g/l. A density of the catalyst was 0.8 g/ml. Additionally, a volume covered by all the catalyst layers in the whole honeycomb catalyst body (described as "a volume covered by the catalyst layers" in Table 2) was 380.4 ml. The porosity of the partition walls was smaller than the porosity of the catalyst layers. Moreover, the catalyst layers were not formed on the surfaces of the pores in the partition walls. Specifically, a ratio of a total area of the catalyst layers formed on the surfaces of the pores in the partition walls to a total area of the pores in the partition walls was 0% (described as "a ratio (%) of the catalyst layer on the surface of the pore" in Table 2). The measurement results are shown in Table 1 and Table 2.

Each prepared honeycomb catalyst body was evaluated as follows ([Mechanical Strength], [Catalyst Loading Performance], [Initial Pressure Loss], [Pressure Loss with Soot (4 g/l)], [Collecting Efficiency], [$NO_x$ Purification Performance] and [General Evaluation]). The evaluation results are shown in Table 3.

TABLE 1

| | Length (mm) | Dia. (mm) | Integral structure/ segment structure | Partition wall thickness (μm) | Porosity of partition walls (%) | Ave. pore dia. of partition walls (μm) |
|---|---|---|---|---|---|---|
| Comparative Example 1 | 152.4 | 143.8 | Segment structure | 304 | 65 | 20 |
| Comparative Example 2 | 152.4 | 143.8 | Segment structure | 304 | 65 | 20 |
| Comparative Example 3 | 152.4 | 143.8 | Segment structure | 152 | 60 | 20 |
| Comparative Example 4 | 152.4 | 143.8 | Segment structure | 152 | 20 | 5 |
| Comparative Example 5 | 152.4 | 143.8 | Segment structure | 152 | 40 | 10 |
| Example 1 | 152.4 | 143.8 | Segment structure | 152 | 40 | 10 |
| Example 2 | 152.4 | 143.8 | Segment structure | 152 | 40 | 10 |
| Example 3 | 152.4 | 143.8 | Segment structure | 152 | 40 | 10 |
| Example 4 | 152.4 | 143.8 | Segment structure | 203 | 40 | 10 |
| Example 5 | 152.4 | 143.8 | Segment structure | 102 | 40 | 10 |
| Example 6 | 152.4 | 143.8 | Segment structure | 254 | 40 | 10 |
| Example 7 | 152.4 | 143.8 | Segment structure | 152 | 40 | 10 |
| Example 8 | 152.4 | 143.8 | Segment structure | 152 | 40 | 10 |
| Example 9 | 152.4 | 143.8 | Segment structure | 152 | 40 | 10 |
| Example 10 | 152.4 | 143.8 | Segment structure | 152 | 55 | 15 |
| Example 11 | 152.4 | 143.8 | Segment structure | 152 | 25 | 8 |
| Example 12 | 152.4 | 143.8 | Segment structure | 102 | 25 | 8 |
| Example 13 | 152.4 | 143.8 | Segment structure | 254 | 55 | 15 |

| | Cell density (cells/cm$^2$) | Inflow cell open area (mm$^2$) | Outflow cell open area (mm$^2$) | Open area of outflow cells provided with catalyst layers (mm$^2$) | Open area ratio prior to loading of catalyst (%) | Open area ratio after loading of catalyst (%) |
|---|---|---|---|---|---|---|
| Comparative Example 1 | 47 | 5971 | 3336 | 3336 | 179.0 | 179.0 |
| Comparative Example 2 | 47 | 4577 | 4577 | 3336 | 100.0 | 137.2 |
| Comparative Example 3 | 47 | 4683 | 6998 | 4683 | 66.9 | 100.0 |
| Comparative Example 4 | 47 | 4683 | 6998 | 4683 | 66.9 | 100.0 |
| Comparative Example 5 | 47 | 4683 | 6998 | 5027 | 66.9 | 93.2 |
| Example 1 | 47 | 4683 | 6998 | 4683 | 66.9 | 100.0 |
| Example 2 | 62 | 4338 | 6953 | 4338 | 62.4 | 100.0 |
| Example 3 | 31 | 5110 | 7049 | 5110 | 72.5 | 100.0 |
| Example 4 | 47 | 4301 | 6547 | 4301 | 65.7 | 100.0 |
| Example 5 | 47 | 5080 | 7461 | 5080 | 68.1 | 100.0 |
| Example 6 | 47 | 3934 | 6108 | 3934 | 64.4 | 100.0 |
| Example 7 | 47 | 5632 | 5985 | 5632 | 94.1 | 100.0 |
| Example 8 | 47 | 4174 | 7547 | 4174 | 55.3 | 100.0 |
| Example 9 | 47 | 3458 | 8323 | 3458 | 41.5 | 100.0 |
| Example 10 | 47 | 4683 | 6998 | 4683 | 66.9 | 100.0 |
| Example 11 | 47 | 4683 | 6998 | 4683 | 66.9 | 100.0 |
| Example 12 | 47 | 5080 | 7461 | 5080 | 68.1 | 100.0 |
| Example 13 | 47 | 3934 | 6108 | 3934 | 64.4 | 100.0 |

TABLE 2

| | Type of catalyst | Catalyst layer thickness (μm) | Porosity of catalyst layers (%) | Ave. pore dia. of catalyst layers (μm) | Volume covered by catalyst layers (ml) | Amount of catalyst to be loaded (g/l) | Catalyst density (g/ml) | Ratio of catalyst layer on pore surface (%) |
|---|---|---|---|---|---|---|---|---|
| Comparative Example 1 | Fe zeolite | 35 | 68 | 5 | 309.3 | 100 | 0.8 | 60 |
| Comparative Example 2 | Fe zeolite | 35 | 68 | 5 | 309.3 | 100 | 0.8 | 60 |
| Comparative Example 3 | Fe zeolite | 134 | 68 | 5 | 380.4 | 123.0 | 0.8 | 0 |
| Comparative Example 4 | Fe zeolite | 134 | 68 | 5 | 380.4 | 123.0 | 0.8 | 0 |
| Comparative Example 5 | Fe zeolite | 84 | 68 | 5 | 380.4 | 123.0 | 0.8 | 15 |
| Example 1 | Fe zeolite | 134 | 68 | 5 | 380.4 | 123.0 | 0.8 | 0 |
| Example 2 | Fe zeolite | 134 | 68 | 5 | 430.3 | 139.1 | 0.8 | 0 |
| Example 3 | Fe zeolite | 134 | 68 | 5 | 318.6 | 103.0 | 0.8 | 0 |
| Example 4 | Fe zeolite | 134 | 68 | 5 | 368.5 | 119.1 | 0.8 | 0 |
| Example 5 | Fe zeolite | 134 | 68 | 5 | 392.3 | 126.8 | 0.8 | 0 |
| Example 6 | Fe zeolite | 134 | 68 | 5 | 356.6 | 115.3 | 0.8 | 0 |
| Example 7 | Fe zeolite | 20 | 68 | 5 | 59.4 | 19.2 | 0.8 | 0 |
| Example 8 | Fe zeolite | 200 | 68 | 5 | 554.0 | 179.1 | 0.8 | 0 |
| Example 9 | Fe zeolite | 300 | 68 | 5 | 798.9 | 258.2 | 0.8 | 0 |
| Example 10 | Fe zeolite | 134 | 68 | 5 | 380.4 | 123.0 | 0.8 | 0 |
| Example 11 | Fe zeolite | 134 | 68 | 5 | 380.4 | 123.0 | 0.8 | 0 |
| Example 12 | Fe zeolite | 134 | 68 | 5 | 392.3 | 126.8 | 0.8 | 0 |
| Example 13 | Fe zeolite | 134 | 68 | 5 | 356.6 | 115.3 | 0.8 | 0 |

TABLE 3

| | Catalyst loading performance | Initial pressure loss (kPa) | Initial pressure loss Evaluation | Pressure loss with soot (4 g/l) (kPa) | Pressure loss with soot (4 g/l) Evaluation | Collecting efficiency (No./km) | Collecting efficiency Evaluation | Mechanical strength (MPa) | Mechanical strength Evaluation | $NO_x$ purification performance after aging (compared with that prior to aging) (%) | $NO_x$ purification performance Evaluation | General evaluation |
|---|---|---|---|---|---|---|---|---|---|---|---|---|
| Comparative Example 1 | C | 11.62 | C | 23.81 | B | 2.5E+11 | B | 4.4 | C | 75 | C | Fail |
| Comparative Example 2 | C | 8.81 | B | 27.09 | C | 2.5E+11 | B | 4.6 | C | 75 | C | Fail |
| Comparative Example 3 | B | 4.47 | A | 18.60 | A | 6.3E+11 | C | 2.8 | D | 90 | A | Fail |
| Comparative Example 4 | B | 5.50 | B | 40.38 | D | 6.3E+10 | A | 10.5 | A | 90 | A | Fail |
| Comparative Example 5 | B | 12.42 | C | 31.04 | C | 1.1E+11 | B | 7.7 | B | 90 | A | Fail |
| Example 1 | B | 4.97 | B | 23.28 | B | 1.1E+11 | B | 7.7 | B | 90 | A | Pass |
| Example 2 | B | 6.17 | B | 27.42 | C | 1.1E+11 | B | 9.2 | B | 90 | A | Pass |
| Example 3 | B | 3.92 | A | 22.14 | B | 1.1E+11 | B | 6.2 | B | 90 | A | Pass |
| Example 4 | B | 5.96 | B | 27.39 | C | 9.0E+10 | A | 10.2 | A | 90 | A | Pass |
| Example 5 | B | 4.16 | A | 19.71 | A | 1.4E+11 | B | 5.2 | C | 90 | A | Pass |
| Example 6 | B | 7.21 | B | 32.19 | C | 6.7E+10 | A | 12.8 | A | 90 | A | Pass |
| Example 7 | C | 3.35 | A | 23.76 | B | 1.1E+11 | B | 7.8 | B | 90 | A | Pass |
| Example 8 | B | 6.24 | B | 28.53 | C | 1.1E+11 | B | 7.5 | B | 90 | A | Pass |
| Example 9 | A | 9.23 | B | 39.48 | C | 1.1E+11 | B | 7.3 | B | 90 | A | Pass |
| Example 10 | B | 4.65 | B | 19.38 | A | 2.0E+11 | B | 5.8 | C | 90 | A | Pass |
| Example 11 | B | 5.29 | B | 27.18 | C | 6.5E+10 | A | 9.8 | B | 90 | A | Pass |
| Example 12 | B | 4.43 | A | 23.01 | B | 9.8E+10 | A | 6.5 | B | 90 | A | Pass |
| Example 13 | B | 6.75 | B | 26.58 | C | 1.6E+11 | B | 8.8 | B | 90 | A | Pass |

[Mechanical Strength]:

A mechanical strength (an A-axis compressive strength) of each plugged honeycomb structure prior to the loading of the catalyst was measured as follows (described as "the mechanical strength" in Table 3). The A-axis compressive strength is a compressive strength (MPa) stipulated in JASO standard M505-87 as a car standard issued by the Society of Automotive Engineers of Japan. Specifically, a sample (a small honeycomb structure) having a diameter of 25.4 mm and a height of 25.4 mm was cut out from the above plugged honeycomb structure. Afterward, a compressive load was applied to this sample (the small honeycomb structure) in a through channel direction. Moreover, a pressure at breakdown of the sample was "the A-axis compressive strength (the mechanical strength)".

As to evaluation standards, when the A-axis compressive strength was smaller than 3.0 MPa, the evaluation result was "D", and when the strength was 3.0 MPa or more and smaller than 6.0 MPa, the result was "C". When the strength was 6.0 MPa or more and smaller than 10.0 MPa, the result was "B", and when the strength was 10.0 MPa or more, the result was "A".

[Catalyst Loading Performance]:

A loading amount at the loading of the catalyst was measured. The measured loading amount was evaluated in terms of the following standards. In this evaluation, the purification performance can be evaluated. That is, when a value of this evaluation is high, it can be judged that the purification performance is high.

As to the evaluation standards, when the loading amount of the catalyst was 10 g/l or less, the evaluation result was "D", and when the amount was in excess of 10 g/l and 100 g/l or less, the result was "C". When the amount was in excess of 100 g/l and 200 g/l or less, the result was "B", and when the amount was in excess of 200 g/l, the result was "A".

[Initial Pressure Loss]:

As to each plugged honeycomb catalyst body onto which the catalyst was loaded, the initial pressure loss was measured as follows (described as "the initial pressure loss" in Table 3). It is to be noted that the initial pressure loss is a pressure loss measured on the conditions that any soot is not deposited. First, differential pressure gauges were attached to an inflow end surface and an outflow end surface of the plugged honeycomb catalyst body. Next, air was allowed to flow through the plugged honeycomb catalyst body on conditions of room temperature under an atmospheric pressure at a rate of 10 m$^3$/minute, and a differential pressure between an inflow end surface side space and an outflow end surface side space was measured. In this way, the initial pressure loss of the plugged honeycomb catalyst body was measured. Afterward, evaluation was performed in terms of the following standards based on the measured pressure loss.

As to the evaluation standards, when the initial pressure loss of the plugged honeycomb catalyst body was smaller than 4.50 kPa, the evaluation result was "A", and when the initial pressure loss was 4.50 kPa or more and smaller than 10.00 kPa, the result was "B". Moreover, when the initial pressure loss was 10.00 kPa or more and smaller than 15.00 kPa, the result was "C", and when the initial pressure loss was 15.00 kPa or more, the result was "D".

[Pressure Loss with Soot (4 g/l)]:

Soot was deposited by a device in which light oil was burnt to generate the soot in a pseudo manner. As to each plugged honeycomb catalyst body at the deposition of the soot (4 g/l), the pressure loss was measured as follows. First, the differential pressure gauges were attached to the inflow end surface and the outflow end surface of the plugged honeycomb catalyst body. Next, air was allowed to flow through the plugged honeycomb catalyst body on conditions of 200° C. under an atmospheric pressure at a rate of 2.27 m$^3$/minute, and a differential pressure between the inflow end surface side space and the outflow end surface side space was measured. In this way, the pressure loss with the soot (4 g/l) in the plugged honeycomb catalyst body was measured. Afterward, evaluation was performed in terms of the following standards based on the measured pressure loss.

As to the evaluation standards, when the pressure loss with the soot (4 g/l) in the plugged honeycomb catalyst body was smaller than 20.00 kPa, the evaluation result was "A", and when the pressure loss was 20.00 kPa or more and smaller than 25.00 kPa, the result was "B". Moreover, when the pressure loss with the soot (4 g/l) was 25.00 kPa or more and 40.00 kPa or less, the result was "C", and when the pressure loss was in excess of 40.00 kPa, the result was "D".

[Collecting Efficiency]:

As to each plugged honeycomb structure prior to the loading of the catalyst, the collecting efficiency was measured as follows. First, three EUDCs were carried out by using a vehicle on which a 4-cylinder diesel engine of 2.0 liter displacement was mounted (the above plugged honeycomb structure was disposed in an exhaust gas path of the engine), and conditions of the plugged honeycomb structures prior to PN measurement were unified. "EUDC" is an abbreviation of European Urban Driving Cycle. Next, in the engine, a new European driving cycle (NEDC) was carried out, and a PN discharged from the above plugged honeycomb structure was measured by EECPC model 3790 manufactured by Tokyo Dylec Corp. "EECPC" is an abbreviation of Engine Exhaust Condensation Particle Counter. The PN discharged from the engine was $5.0 \times 10^{14}$. In this way, the collecting efficiency of the above plugged honeycomb structure was measured. The measured collecting efficiency was evaluated in terms of the following standards.

As to the evaluation standards, when the collecting efficiency was smaller than $1.0 \times 10^{11}$, the evaluation result was "A", and when the collecting efficiency was $1.0 \times 10^{11}$ or more and smaller than $6.0 \times 10^{11}$, the result was "B". When the collecting efficiency was $6.0 \times 10^{11}$ or more and smaller than $1.0 \times 10^{12}$, the result was "C", and when the collecting efficiency was $1.0 \times 10^{12}$ or more, the result was "D".

[NO$_x$ Purification Performance]:

In the evaluation of the NO$_x$ purification performance, the diesel engine of 2.0 liter displacement was used, a rotation number of the engine was set to 2500 rpm, and urea was sprayed on the inflow end surface of the honeycomb catalyst body so that an equivalent ratio to NO discharged from the engine was 1. Afterward, when a temperature of a gas flowing into the honeycomb catalyst body was 200° C., a concentration of NO$_x$ in the gas discharged from the honeycomb catalyst body was measured. Then, the purification performance was evaluated on the basis of the concentration of NO$_x$ discharged from the engine. First, the honeycomb catalyst body was disposed in the exhaust gas path of the engine, and NO$_x$ on the outflow side of the honeycomb catalyst body was measured ("the NO$_x$ purification performance before aging" was measured). Next, as to this honeycomb catalyst body, the NO$_x$ purification performance after the aging was measured as follows. First, the honeycomb catalyst body was disposed in an electric furnace, the inside of the electric furnace was kept at 650° C. in an atmosphere of 10 mass % of water and 10 mass % of oxygen, and the honeycomb catalyst body was heated for 100 hours. Next, the engine was used (the honeycomb catalyst body was disposed in the exhaust gas path of the engine), and NO$_x$ on the outflow side of the honeycomb catalyst body was measured by "MEXA7500D" manufactured by HORIBA Co. In this way, "the NO$_x$ purification performance after the aging" of the honeycomb catalyst body was measured. The measured "NO$_x$ purification performance after the aging" was evaluated in terms of the following standards.

As to the evaluation standards, when a percentage of the NO$_x$ purification performance after the aging to the NO$_x$ purification performance before the aging was smaller than 70%, the evaluation result was "D", and when the percentage was 70% or more and smaller than 80%, the result was "C". Moreover, when the percentage of the NO$_x$ purification performance after the aging was 80% or more and smaller than 90%, the result was "B", and when the percentage was 90% or more and 100% or less, the result was "A".

[General Evaluation]:

Among the above respective evaluations, when one or more "D" evaluations were present or when two or more "C" evaluations were present, it was judged that the honeycomb catalyst body "failed". In the other cases, it was judged that the honeycomb catalyst body "passed".

As shown in Table 3, in the honeycomb catalyst body of the present example, the result was "B" in [Catalyst Loading Performance], and the result was "B" in [Initial Pressure Loss]. Moreover, the result was "B" in [Pressure Loss with Soot (4 g/l)]. Furthermore, the result was "B" in [Collecting Efficiency], the result was "B" in [Mechanical Strength], and the result was "A" in [$NO_x$ Purification Performance]. Therefore, the honeycomb catalyst body "passed" in [General Evaluation].

Examples 2 to 13 and Comparative Examples 1 to 5

The procedures of Example 1 were repeated except that conditions shown in Table 1 and Table 2 were satisfied, to prepare each honeycomb catalyst body. The prepared honeycomb catalyst bodies were evaluated as described above. The evaluation results are shown in Table 1.

It was possible to confirm that the honeycomb catalyst bodies of Examples 1 to 13 did not "fail" in [General Evaluation], and had a high mechanical strength, an excellent exhaust gas purification performance and less pressure loss.

A honeycomb catalyst body of the present invention can suitably be employed as a filter to purify an exhaust gas discharged from a car engine, a construction machine engine, an industrial stationary engine, a burning device or the like.

DESCRIPTION OF REFERENCE MARKS

1: partition wall, 2: cell, 2a: inflow cell, 2b: outflow cell, 5: catalyst layer, 8a: outflow side plugged portion, 8b: inflow side plugged portion, 10: honeycomb structure, 11: inflow side end surface, 12: outflow side end surface, and 100: honeycomb catalyst body.

What is claimed is:

1. A honeycomb catalyst body comprising:
   a honeycomb structure having porous partition walls with which a plurality of cells extending from an inflow side end surface to an outflow side end surface are defined and formed to become through channels of an exhaust gas;
   outflow side plugged portions arranged in open frontal areas of the predetermined cells in the outflow side end surface, to form the inflow cells which are open in the inflow side end surface and are closed in the outflow side end surface;
   inflow side plugged portions arranged in open frontal areas of the remaining cells in the inflow side end surface, to form the outflow cells which are open in the outflow side end surface and are closed in the inflow side end surface; and
   porous catalyst layers formed on the surfaces of the partition walls on the side of the outflow cells, and having a catalyst to purify the exhaust gas,
   wherein in the honeycomb structure, the inflow cells and the outflow cells are alternately arranged via the partition walls, and the plurality of cells are formed so that, prior to forming the porous catalyst layers, an open area of each of the outflow cells in a cross section of the outflow cell perpendicular to an extending direction of the cells is larger than an open area of each of the inflow cells in a cross section of the inflow cell perpendicular to the extending direction of the cells,
   wherein a porosity of the partition walls of the honeycomb structure is from 25 to 55%,
   wherein the catalyst layers are not formed on the surfaces of the partition walls on the side of the inflow cells, and wherein the catalyst layers are not formed on the surfaces of the pores in the partition walls, or even when the catalyst layers are formed on the surfaces of the pores in the partition walls, a total area of the catalyst layers formed on the surfaces of the pores in the partition walls is 5% or less of a total area of the pores in the partition walls, in a cross section parallel to the extending direction of the cells.

2. The honeycomb catalyst body according to claim 1, wherein the porosity of the catalyst layers is from 20 to 80%.

3. The honeycomb catalyst body according to claim 2, wherein the open area of the outflow cell is from 1.01 to 2.5 times the open area of the inflow cell prior to the formation of the catalyst layers.

4. The honeycomb catalyst body according to claim 3, wherein a percentage of the open area of the outflow cell provided with the catalyst layer to the open area of the inflow cell is from 95 to 125%.

5. The honeycomb catalyst body according to claim 4, wherein the open area of the outflow cell provided with the catalyst layer is equal to the open area of the inflow cell.

6. The honeycomb catalyst body according to claim 3, wherein the open area of the outflow cell provided with the catalyst layer is equal to the open area of the inflow cell.

7. The honeycomb catalyst body according to claim 2, wherein a percentage of the open area of the outflow cell provided with the catalyst layer to the open area of the inflow cell is from 95 to 125%.

8. The honeycomb catalyst body according to claim 7, wherein the open area of the outflow cell provided with the catalyst layer is equal to the open area of the inflow cell.

9. The honeycomb catalyst body according to claim 2, wherein the open area of the outflow cell provided with the catalyst layer is equal to the open area of the inflow cell.

10. The honeycomb catalyst body according to claim 1, wherein the open area of the outflow cell is from 1.01 to 2.5 times the open area of the inflow cell prior to the formation of the catalyst layers.

11. The honeycomb catalyst body according to claim 10, wherein a percentage of the open area of the outflow cell provided with the catalyst layer to the open area of the inflow cell is from 95 to 125%.

12. The honeycomb catalyst body according to claim 11, wherein the open area of the outflow cell provided with the catalyst layer is equal to the open area of the inflow cell.

13. The honeycomb catalyst body according to claim 10, wherein the open area of the outflow cell provided with the catalyst layer is equal to the open area of the inflow cell.

14. The honeycomb catalyst body according to claim 1, wherein a percentage of the open area of the outflow cell provided with the catalyst layer to the open area of the inflow cell is from 95 to 125%.

15. The honeycomb catalyst body according to claim 14, wherein the open area of the outflow cell provided with the catalyst layer is equal to the open area of the inflow cell.

16. The honeycomb catalyst body according to claim 1, wherein the open area of the outflow cell provided with the catalyst layer is equal to the open area of the inflow cell.

17. The honeycomb catalyst body according to claim 1, wherein a thickness of each of the partition walls is from 102 to 254 μm.

18. The honeycomb catalyst body according to claim 1, wherein a thickness of each of the catalyst layers is from 20 to 300 μm.

* * * * *